US006169682B1

United States Patent
Han et al.

(10) Patent No.: US 6,169,682 B1
(45) Date of Patent: Jan. 2, 2001

(54) NON-DIRECTIONAL FREQUENCY GENERATOR SPARK REMOVAL CIRCUIT

(75) Inventors: Yong-woon Han, Kunpo; Seong-deog Jang; Kwang-seok Kang, both of Suwon; Han-jun Sung, Seoul, all of (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 09/501,605

(22) Filed: Feb. 10, 2000

(30) Foreign Application Priority Data

Sep. 21, 1999 (KR) .............................................. P99-40530

(51) Int. Cl.[7] .................................................. H02M 7/60
(52) U.S. Cl. ................................................................ 363/109
(58) Field of Search .................................... 363/102, 106, 363/107, 109, 120–122, 165, 170, 171, 174, 176, 177

(56) References Cited

U.S. PATENT DOCUMENTS

| 4,194,239 | * | 3/1980 | Jayaram et al. ....................... 363/109 |
| 5,633,792 | * | 5/1997 | Massey .................................. 363/109 |
| 6,081,082 | * | 6/2000 | Kim et al. ............................. 318/140 |

* cited by examiner

*Primary Examiner*—Matthew Nguyen
(74) *Attorney, Agent, or Firm*—Robert E. Bushnell, Esq.

(57) ABSTRACT

A non-directional frequency generator for converting direct current into alternating current includes a direct current input end connected with a direct current power source and an alternating current output end connected with an alternating current output section to prevent a spark of the non-directional frequency generator. The non-directional frequency generator converts direct current inputted from the direct current power source into alternating current, and outputs the alternating current to the alternating current output section. First and second switching sections are connected with the direct current input end and the alternating current output end in order to control the conducting status of the direct current input end and the alternating current output end of the non-directional frequency generator, respectively. A third switching section is connected in parallel with the first switching section, and is intermittently switched on when the second switching section is switched on and the first switching section is switched off. The first and second switching sections are relays, while the third switching section is an integrated gate bipolar transistor. When direct current is applied, a microcomputer switches on the non-directional frequency generator and the second switching section, and intermittently applies the direct current to the non-directional frequency generator through switching means until the first switching section is switched on. Accordingly, difference between impedances of input and output sides of the non-directional frequency generator is decreased, and the spark is prevented. Further, since direct current is intermittently applied during a brush-on period in which a conductive part and a brush of the non-directional frequency generator are in contact, the spark which is caused at the beginnings of the brush-on/off periods, is also prevented.

6 Claims, 3 Drawing Sheets

NON-DIRECTIONAL FREQUENCY GENERATOR SPARK REMOVAL CIRCUIT

CLAIM OF PRIORITY

This application makes reference to, incorporates the same herein, and claims all benefits accruing under 35 U.S.C. §119 from an application for NDFG SPARK REMOVAL CIRCUIT FOR AN AC/DC MOCROWAVE OVEN earlier filed in the Korean Industrial Property Office on Sep. 21, 1999 and there duly assigned Ser. No. 40530/1999.

BACKGROUND OF THE INVENTION

1. Field of the Invention

The present invention relates to a non-directional frequency generator spark removal circuit, and more particularly to a non-directional frequency generator spark removal circuit for removing the spark generated from the non-directional frequency generator during the conversion of direct current into alternating current.

2. Description of the Related Art

Generally, electronic appliances such as a microwave oven, etc., are designed to be driven solely by alternating current (hereinafter called AC), and accordingly has a shortcoming in that the electronic appliances can not be used in places such as the outdoors, in the vehicles such as a ship, airplane, etc. where the AC is not available. In order to solve such a problem, a non-directional frequency generator (hereinafter called NDFG) has been developed to convert direct current (hereinafter called DC) into AC in the places where the AC power source is not available.

The NDFG usually uses relays or semiconductor elements for its converting operation into AC. The conventional semiconductor type NDFG circuit, however, has many problems of increasing manufacturing cost due to the expensive semiconductor elements, output loss of the semiconductor elements due to the switching operation, and excessive heat generation due to the output loss, etc.

In order to solve the above problems, the same applicant disclosed NDFG utilizing rotational AC converter to convert DC into AC in the Korean Patent Application Nos. 98-18589 (filed May 22, 1998) and 98-21117 (filed Jun. 8, 1998), which have not been opened to the public yet.

Hereinafter, the above NDFG will be briefly described as a related art with reference to the accompanying drawings.

FIG. 1 is a circuit diagram of the NDFG driven by a DC power source and a magnetron driving section thereof according to the related art.

Referring to FIG. 1, the NDFG 100 includes a motor 110 for generating rotational force by being driven by a DC power source, a commutator 130 rotated by the motor 110, and a plurality of brushes such as first, second, third, and fourth brushes 121–124 as shown in FIG. 1, which are in contact with the outer circumference of the commutator 130. The commutator 130 includes a conductive part which is divided into at least two parts 132a and 132b as shown in FIG. 1, but into an even number of parts. The commutator 130 has an insulating part 133 of a certain width formed between the conductive parts 132a and 132b. The conductive parts 132a and 132b are in simultaneous contact with at least two neighboring brushes of the brushes 121–124. The DC is applied to input sides of the first to fourth brushes 121–124, while the output sides of the first to fourth brushes 121–124 are connected with a high voltage transformer (hereinafter called HVT). The first and second relays $RY_1$ and $RY_2$ switch on/off the operation of the NDFG 100.

The operation of the NDFG 100 is as follows: When the first and second relays $RY_1$ and $RY_2$ are in the on-state, the commutator 130 is rotated by the DC power source. Accordingly, the brushes 121–124 in contact with the commutator 130 come in contact with the conductive part 132a, the insulating part 133, the conductive part 132b, and the insulating part 133 which are formed on the outer circumference of the commutator 130, sequentially.

More specifically, as the first brush 121 comes in contact with the conductive part 132a of the commutator 130, the electric current from the positive (+) terminal of the DC power source is inputted into the first brush 121, and flows through the conductive part 132a of the commutator 130 and the fourth brush 124, and to the upper portion of the primary coil 202 of the HVT downwardly to the lower portion of the primary coil 202 of the HVT. Then, the electric current is inputted into the second brush 122, and circulates through the conductive part 132b, the third brush 123, and to the negative (−) terminal of the DC power source.

Next, as the commutator 130 is further rotated and as the first brush 121 accordingly comes in contact with the insulating part 133, the electric current does not flow through the commutator 130.

Then, as the commutator 130 is further rotated to 90°, the electric current from the positive (+) terminal of the DC power source is inputted into the first brush 121, flows through the conductive part 132b of the commutator 130 and the second brush 122, reverses its direction, and flows from the lower portion of the primary coil 202 of the HVT to the upper portion of the primary coil 202 of the HVT. Then, the electric current is inputted into the fourth brush 124, flows through the conductive part 132a, and the third brush 123, and then circulates to the negative (−) terminal of the DC power source.

By the constant rotation of the commutator 130 of the NDFG, the AC is generated at the primary coil 202 of the HVT in a manner as described above. Then the AC is transmitted to a secondary coil of the HVT through the primary coil 202 thereof. Then, the HVT converts the normal voltage into a high voltage, and the magnetron MGT is driven by the high voltage stepped-up by the HVT.

As described above, by the periodic contact of the brushes 121–124 with the conductive parts 132a and 132b during the rotation of the commutator 130 of the NDFG, DC is converted into AC. The problem is that there is excessive spark produced between the commutator 130 and the brushes 121–124 due to a low impedance of the HVT during the initial application of the DC to the NDFG. The spark becomes more excessive when the brushes enter into/escape from the contact with the conductive parts 132a and 132b of the commutator 130.

SUMMARY OF THE INVENTION

The present invention has been developed to overcome the above-mentioned problems of the related art, and accordingly, it is an object of the present invention to provide a non-directional frequency generator spark removal circuit capable of removing the spark by performing pre-operation of intermittently applying a voltage prior to the actual operation of electronic appliances until a high voltage transformer thereof is increased to a certain impedance.

The above object is accomplished by a non-directional frequency generator spark removal circuit according to the present invention, including: a non-directional frequency generator having a direct current input end connected with a direct current power source, and an alternating current output end connected with an alternating current output section, for converting the direct current inputted from the direct current power source into alternating current, and for outputting the alternating current to the alternating current output section; first and second switching sections connected with the direct current input end and the alternating current output end, respectively, for controlling a conducting status between the direct current input end and the alternating current output end of the non-directional frequency generator; and a third switching section connected in parallel with the first switching section, for intermittently switching so as to control the conducting status of the non-directional frequency generator.

The third switching section is an integrated gate bipolar transistor, and the intermittent switching of the third switching section is kept being performed until the impedance of a high voltage transformer connected with the alternating current output end is increased to a certain impedance. Further, during the intermittent switching of the third switching section, the third switching section is only switched on during a brush-on period in which a conductive part and a brush of the non-directional frequency generator are in contact with each other.

The first and second switching sections are relays.

In the non-directional frequency generator spark removal circuit according to the preferred embodiment of the present invention, the pre-operation is performed for a certain period of time before the actual operation of non-directional frequency generator for normally driving the non-directional frequency generator by turning on the first and second switching sections. In the pre-operation, the second switching section is turned on, while the first switching section is turned off. In such a situation, the third switching section, i.e., the integrated gate bipolar transistor, which is connected in parallel with the first switching section is intermittently switched on for a certain period of time. The intermittent switching of the third switching section is performed until the secondary coil of the high voltage transformer is increased to a certain impedance. Then, as the secondary coil of the high voltage transformer is increased to the certain impedance, the first switching section is switched on, and the actual operation of the non-directional frequency generator is performed. As a result, the possible generation of the spark is prevented.

Further, during the rotation of the commutator, by controlling the switching period of the third switching section to correspond with the brush-on period, the spark generated at the beginnings of brush-on/off periods can be prevented.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE PREFERRED EMBODIMENT

Figure 1:
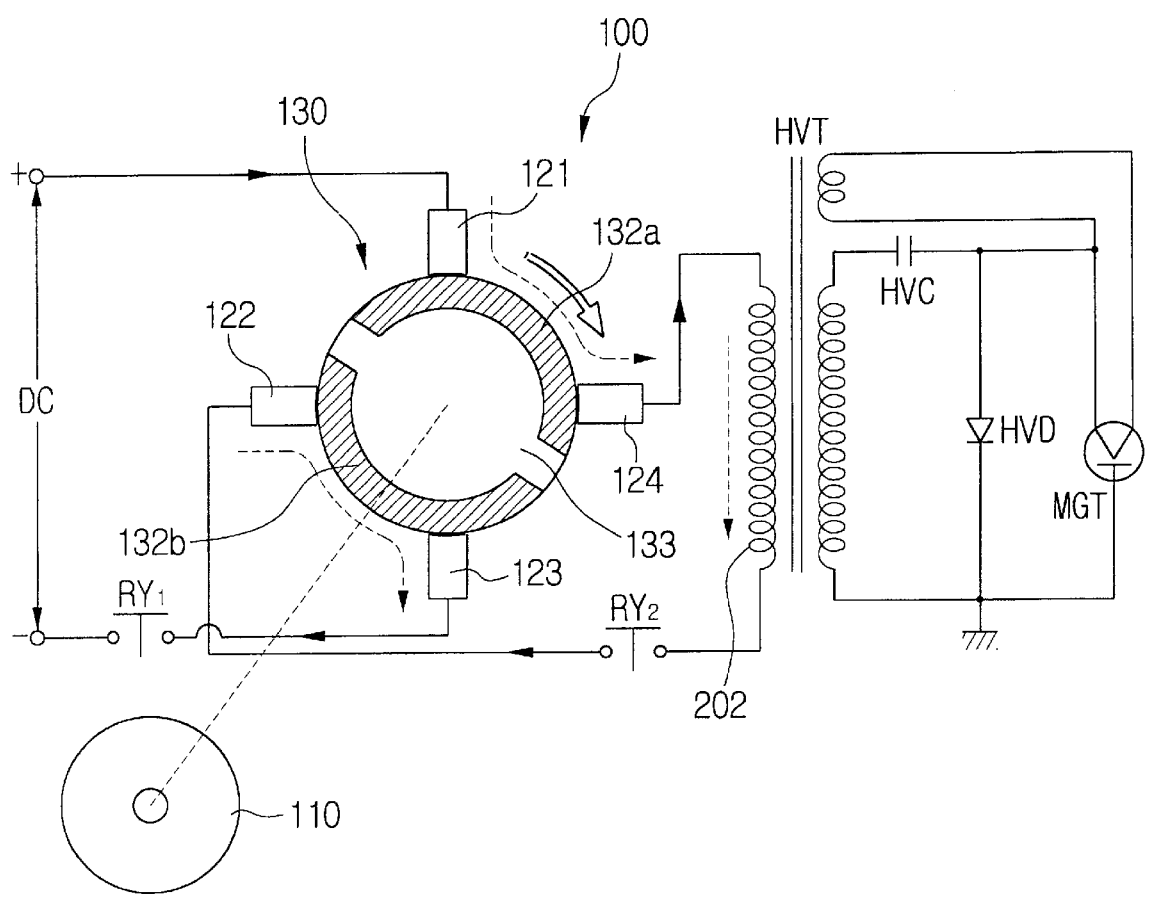
FIG. 1 is a circuit diagram for showing a non-directional frequency generator and a magnetron driving section connected thereto according to the related art.

Hereinafter, the preferred embodiment of the present invention will be described in greater detail with reference to the accompanied drawings, while the like elements are referred to by the same reference numerals throughout.

Figure 2:
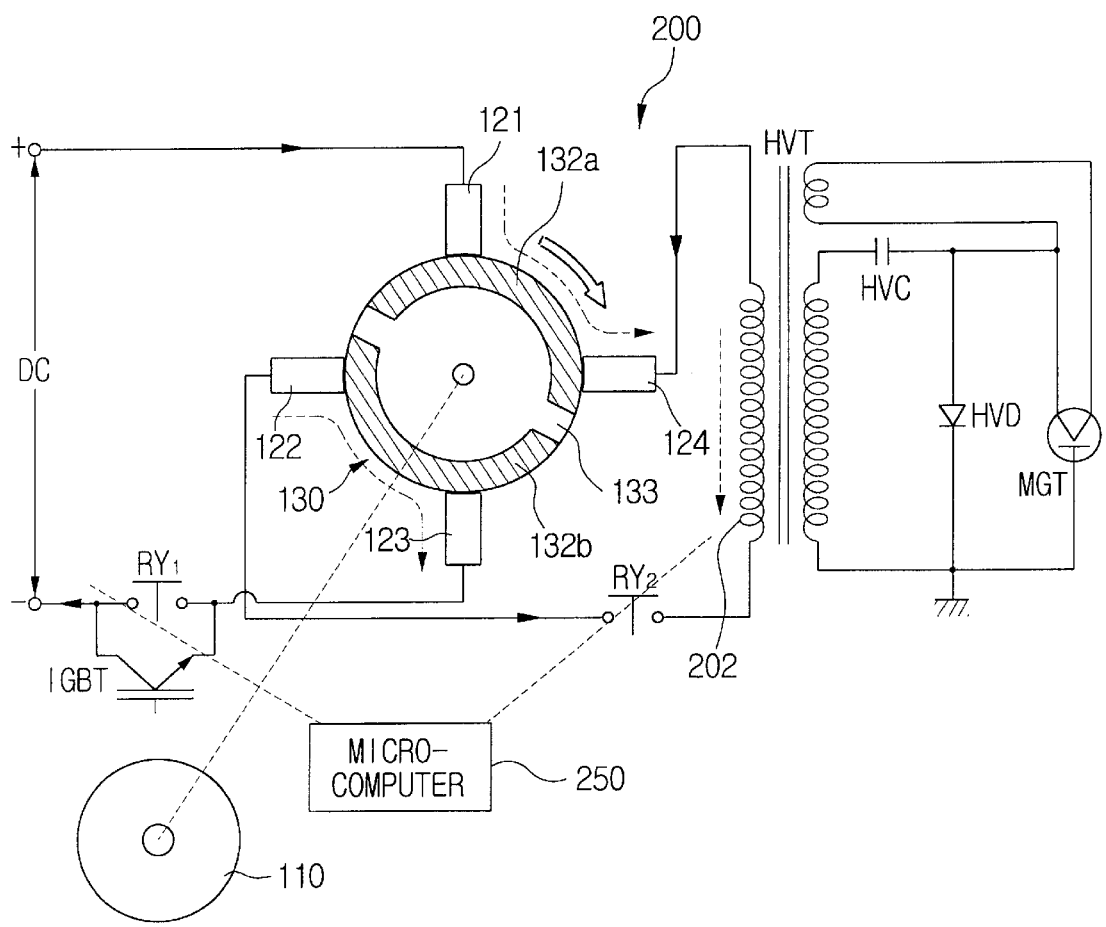
FIG. 2 is a circuit diagram for showing a non-directional frequency generator and a magnetron driving section connected thereto according to a preferred embodiment of the present invention.
Figure 3:
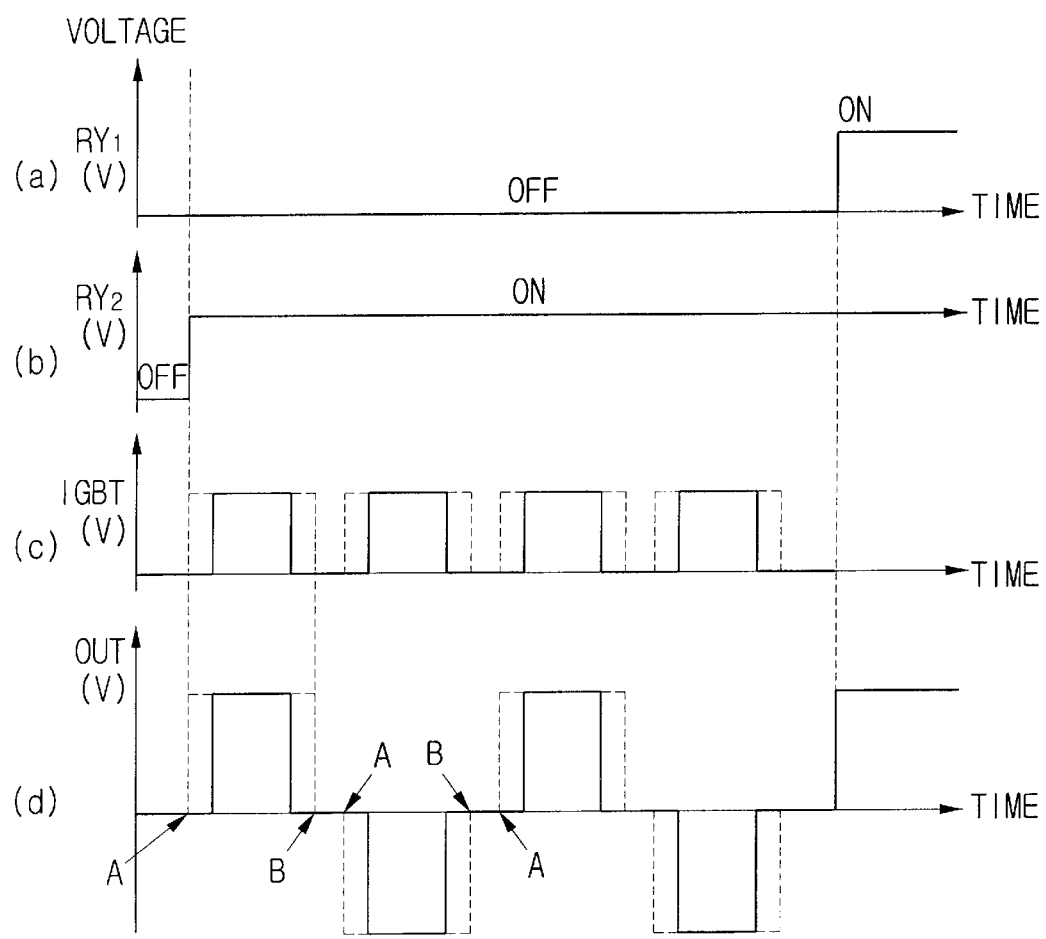
FIG. 3 is a waveform for showing the operation and output waves from the respective components shown in FIG. 2.

FIG. 2 is a circuit diagram for showing the non-directional frequency generator and the magnetron driving section connected thereto according to a preferred embodiment of the present invention, and FIG. 3 is a waveform for showing the operation and output waves from the respective components shown in FIG. 2, in which (a), (b), (c), and (d) refer to the output waves of a first relay $RY_1$ as a first switching section, a second relay $RY_2$ as a second switching section, an integrated gate bipolar transistor (hereinafter called IGBT) as a third switching section, and a non-directional frequency generator NDFG, respectively.

Referring to FIG. 2, the NDFG 200 includes a motor 110 driven by a direct current DC power source to generate rotational force.

A commutator 130 of the NDFG 200 includes a conductive part formed on the outer circumference of a cylindrical body of the NDFG 200 which is rotated by the motor 110, and an insulating part 133. The conductive part is divided into at least two parts 132a and 132b as shown in FIG. 2, but into an even number of parts, and the insulating part is formed at a certain width between the conductive parts 132a and 132b.

A plurality of brushes such as a first, second, third, and fourth brushes 121–124 as shown in FIG. 2, are in contact with the outer circumference of the commutator 130, functioning as electrical connective ends. The two neighboring brushes of the four brushes 121–124 are in simultaneous contact with one of the conductive parts 132a and 132b.

The first and second switching sections, which are respectively comprised of the first and second relays $RY_1$, and $RY_2$, turn on/off the operation of the NDFG 200. The first relay $RY_1$ is disposed at the input side of the DC power source of the NDFG 200 to on-off control the supply of the DC to the commutator 130 of the NDFG 200. The second relay $RY_2$ is disposed on the output side of the NDFG 200 to on-off control the input of the current outputted from the NDFG 200 to a high voltage transformer HVT.

The third switching section, which is comprised of the integrated gate bipolar transistor IGBT, is connected in parallel with the first relay $RY_1$, and is controlled by a microcomputer 250. The IGBT bypasses the voltage to the NDFG 200 under the control of the microcomputer 250 when the first relay $RY_1$ is turned off.

Meanwhile, the DC is applied to the input sides of the first to fourth brushes 121–124, while the output sides of the brushes 121–124 are connected with an AC outputting section, i.e., the HVT.

Thus, the first relay $RY_1$, or the IGBT is turned on, and the second relay $RY_2$ is turned on, and the DC waveforms are inputted to the commutator 130 through the brushes 121–124 from the DC power source, and are converted into AC waveforms by the rotational movement of the commutator 130 to be outputted.

The operation of the NDFG spark removal circuit constructed as above will be described below.

First, as the electronic appliances such as an AC/DC type microwave oven having the NDFG is selected to be operated by the DC power source, the microcomputer 250 rotates the motor 110 by supplying the power to the NDFG 200. By the rotation of the motor 110, the commutator 130 is rotated.

According to the rotation of the commutator 130, the brushes 121–124 in contact with the outer circumference of the commutator 130 come in contact with the conductive part 132a, the insulating part 133, the conductive part 132b, and the insulating part 133 which are formed on the outer circumference of the commutator 130, sequentially. Here, when the brushes 121–124 are in contact with the conductive parts 132a and 132b of the commutator 130, the brushes 121–124 and the commutator 130 are in the conducting status, and such a status is called the brush-on period. The brush-off period is when the brushes 121–124 are in contact with the insulating part 133 of the commutator 130 and the brushes 121–124 and the commutator 130 are accordingly in the non-conducting status. The brush on/off periods alternate each other during the rotation of the commutator 130.

The microcomputer 250 turns off the first relay $RY_1$, while turning on the second relay $RY_2$ (See (a) and (b) of FIG. 3). In such a situation, since the first relay $RY_1$ is in the off-state, the electric current does not flow through the commutator 130.

Meanwhile, as shown by (c) of FIG. 3, the IGBT is intermittently switched on by the microcomputer 250 while the first relay $RY_1$ is in the off-state, so as to intermittently apply the voltage to the NDFG 200. That is, while the IGBT is switched on instead of the first relay $RY_1$, the voltage is applied to the NDFG 200, since the second relay $RY_1$ is switched on.

During the rotation of the commutator 130, as shown by (d) of FIG. 3, the IGBT is controlled to be switched on only during the brush-on period. Accordingly, the spark, which is generated between the ends of the brushes 121–124 and the commutator 130 of the NDFG 200 at the beginnings (A and B) of the brush-on/off periods, is prevented.

By the intermittent switching of the IGBT, the electric voltage is applied to the NDFG 200 or ceased, applying the power of AC waveforms to the primary coil 202 of the HVT as shown by (d) of FIG. 3.

As described above, the intermittent application of the electric voltage is the pre-operation performed until the driving circuit of the electronic appliances such as the AC/DC type microwave oven, etc., is completely driven. Since the HVT has a low impedance in its initial driving, the pre-operation is kept being performed until a high voltage capacitor HVC connected with a secondary coil of the HVT is substantially charged, and thus the impedance of the HVT is increased to a predetermined impedance, in order to prevent the excessive spark production between the commutator 130 and the brushes 121–124.

When the secondary coil of the HVT is increased to the predetermined impedance by means of charging the high voltage capacitor HVC, the intermittent voltage application through the IGBT is stopped, and the first relay $RY_1$ is switched on to perform the actual operation.

In the actual operation, as the commutator 130 is rotated clockwise, the first brush 121 on the upper portion of the commutator 130 firstly comes in contact with the conductive part 132a, and the electric current from the positive (+) terminal of the DC power source is inputted into the first brush 121, flows through the conductive part 132a of the commutator 130, the fourth brush 122, the upper portion of the primary coil 202 of the HVT to the lower portion of the primary coil 202 of the HVT. Then, the electric current is inputted into the second brush 122, flows through the conductive part 132b, the third brush 123, and circulates to the negative (−) terminal of the DC power source. Then as the commutator 130 is further rotated clockwise, the first brush 121 comes in contact with the insulating part 133, and the electric current does not flow through the commutator 130. As the commutator 130 is further rotated to 90°, the electric current from the positive (+) terminal of the DC power source is inputted into the first brush 121, flows through the conductive part 132b of the commutator 130, the second brushes 122, reverses its direction to the lower portion of the primary coil 202 of the HVT upwardly to the upper portion of the primary coil 202 of the HVT. Then, the electric current is inputted into the fourth brush 124, and circulates the conductive part 132a, the third brush 123, and to the negative (−) terminal of the DC power source.

In the above manner, the NDFG 200 performs the actual operation, generating AC at the primary coil 202 of the HVT.

As described above, in the NDFG spark removal circuit according to the preferred embodiment of the present invention, the pre-operation is performed for a predetermined period of time before the actual operation of the NDFG for normally driving the NDFG by turning on the first and second switching sections. In the pre-operation, the second switching section is turned on, while the first switching section is turned off. In such a situation, the third switching section, i.e., the IGBT, which is connected in parallel with the first switching section is intermittently switched on for a predetermined period of time. The intermittent switching of the third switching section is performed until the secondary coil of the HVT is increased to a certain impedance. Then, as the secondary coil of the HVT is increased to the certain impedance, the first switching section is switched on, and the actual operation of the NDFG is performed. As a result, the possible generation of the spark is prevented.

Further, during the rotation of the commutator 130, by controlling the switching period of the third switching section to correspond with the brush-on period, the spark generated at the beginnings of brush-on/off periods can be prevented.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A non-directional frequency generator spark removal circuit comprising:

a non-directional frequency generator having a direct current input end connected with a direct current power source, and an alternating current output end connected with an alternating current output section, for converting direct current inputted from the direct current power source into alternating current, and for outputting an alternating current to the alternating current output section;

first and second switching sections connected with the direct current input end and the alternating current output end, respectively, for controlling a conducting status between the direct current input end and the alternating current output end of the non-directional frequency generator; and a third switching section connected in parallel with the first switching section, for intermittently switching to control the conducting status of the non-directional frequency generator.

2. The spark removal circuit as claimed in claim 1, wherein the third switching section comprises an integrated gate bipolar transistor.

3. The spark removal circuit as claimed in claim 1, wherein the intermittent switching of the third switching section is kept being performed until the impedance of a high voltage transformer connected with the alternating current output end is increased to a predetermined impedance.

4. The spark removal circuit as claimed in claim 1, during the intermittent switching of the third switching section, the third switching section is only switched on during a brush-on period in which a conductive part and a brush of the non-directional frequency generator are in contact with each other.

5. The spark removal circuit as claimed in claim 1, wherein the intermittent switching of the third switching section is controlled by a microcomputer.

6. The spark removal circuit as claimed in claim 1, wherein the first and second switching sections comprise relays.

* * * * *